(12) United States Patent
Fujii

(10) Patent No.: US 8,111,771 B2
(45) Date of Patent: Feb. 7, 2012

(54) WIRELESS COMMUNICATION APPARATUS AND METHOD USING BEAMFORMING

(75) Inventor: Masaaki Fujii, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 900 days.

(21) Appl. No.: 12/111,358

(22) Filed: Apr. 29, 2008

(65) Prior Publication Data

US 2008/0316099 A1 Dec. 25, 2008

(30) Foreign Application Priority Data

Jun. 19, 2007 (JP) ................................. 2007-161543
Dec. 12, 2007 (KR) ........................ 10-2007-0129106

(51) Int. Cl.
*H04B 7/02* (2006.01)
(52) U.S. Cl. ......................... 375/267; 375/296; 375/346

(58) Field of Classification Search ................. 375/260, 375/267, 296, 299, 346
See application file for complete search history.

(56) References Cited

U.S. PATENT DOCUMENTS 7,818,013 B2 * 10/2010 Li et al. ...................... 455/452.2
2009/0046800 A1 * 2/2009 Xu et al. ....................... 375/267
* cited by examiner

*Primary Examiner* — David Lugo
(74) *Attorney, Agent, or Firm* — NSIP Law

(57) ABSTRACT

A wireless transmitting method includes calculating a beamforming channel matrix which is a channel matrix generated at a time when a transmitting apparatus applies a beamforming matrix to a data signal and transmits the data signal to receiving apparatuses, selecting a parameter to be used while transmitting the data signal based on the beamforming channel matrix and noise information fed back from the receiving apparatuses, and transmitting the data signal by using the selected parameter.

20 Claims, 9 Drawing Sheets

DIAGRAM FOR ZERO-FORCING BEAMFORMING

WIRELESS COMMUNICATION APPARATUS AND METHOD USING BEAMFORMING

CROSS-REFERENCE TO RELATED APPLICATIONS

This application claims the benefit of Japanese Patent Application No. 2007-161543, filed Jun. 19, 2007, in the Japan Patent Office, and Korean Patent Application No. 2007-129106, filed Dec. 12, 2007, in the Korean Intellectual Property Office, the disclosures of which are incorporated herein in their entireties by reference.

BACKGROUND OF THE INVENTION

1. Field of the Invention

Aspects of the present invention relate to a wireless communication apparatus and method using a multiple-input and multiple-output (MIMO) method.

2. Description of the Related Art

A multiple-input and multiple-output (MIMO) method is a technology that is used to accelerate communication speed between wireless apparatuses. The MIMO method inputs and outputs a signal by using a plurality of antennas. A characteristic of the MIMO method is that plural pieces of transmission data can be simultaneously transmitted by using different antennas. Accordingly, as the number of channels that can simultaneously transmit data increases, the amount of information that can be transmitted per unit time also increases according to an increased number of channels. Also, according to the MIMO method, the number of frequency bands that are occupied does not increase as the communication speed increases.

However, since a plurality of modulating signals having a carrier wave component of the same frequency is simultaneously transmitted, a receiving apparatus requires a device to separate mixed modulating signals. Accordingly, the receiving apparatus estimates a channel matrix that shows a transmission characteristic of a wireless transmission path, and separates a transmission signal corresponding to each sub-stream transmitted from a transmitting apparatus, from a reception signal based on the estimated channel matrix. The channel matrix is estimated by using a pilot signal, or the like. The pilot signal is a signal already known by the receiving and transmitting apparatuses, and the receiving and transmitting apparatuses can estimate the channel matrix by transmitting and receiving the pilot signal.

However, specific research is required to realize a high precision transmission signal corresponding to a sub-stream by sufficiently removing effects of noise added in the transmission path and interference generated between sub-streams.

SUMMARY OF THE INVENTION

One or more embodiments of the present invention provide a wireless communication apparatus and method using beamforming to maintain stable throughput in a multi user multiple-input and multiple-output (MIMO) system.

Additional aspects and/or advantages of the invention will be set forth in part in the description which follows and, in part, will be obvious from the description, or may be learned by practice of the invention.

According to an aspect of the present invention, a transmitting apparatus includes a beamforming channel matrix calculator, which calculates a beamforming channel matrix, which is a channel matrix generated at a time when the transmitting apparatus applies a beamforming matrix to a data signal, and then transmits the data signal to receiving apparatuses; a transmission parameter selector, which selects a parameter that is used while the data signal is transmitted by the transmitting apparatus, based on the beamforming channel matrix and noise information fed back from the receiving apparatuses; and a transmitter, which transmits the data signal by using the selected parameter.

According to another aspect of the present invention, a receiving apparatus includes a beamforming channel estimator, which receives a pilot signal to which a beamforming matrix has been applied, from a transmitting apparatus, and estimates a beamforming channel matrix, which is a channel matrix generated at a time when the transmitting apparatus applies the beamforming matrix to the pilot signal and then transmits the pilot signal to the receiving apparatus, from the pilot signal; a transmission parameter selector, which selects a parameter to be used while transmitting a data signal based on the beamforming channel matrix and noise information included in the pilot signal; and a transmitter, which transmits the selected parameter to the transmitting apparatus.

According to another aspect of the present invention, a transmitting method includes calculating a beamforming channel matrix, which is a channel matrix generated at a time when a transmitting apparatus applies a beamforming matrix to a data signal and transmits the data signal to receiving apparatuses; selecting a parameter that is used while transmitting the data signal based on the beamforming channel matrix and noise information fed back from the receiving apparatuses; and transmitting the data signal by using the selected parameter.

According to another aspect of the present invention, a receiving method includes receiving a pilot signal to which a beamforming matrix is applied from a transmitting apparatus, estimating a beamforming channel matrix which is a channel matrix generated at a time when the transmitting apparatus applies the beamforming matrix to the pilot signal and then transmits the pilot signal to a receiving apparatus; selecting a parameter to be used while transmitting a data signal based on the beamforming channel matrix and noise information included in the pilot signal; and transmitting the selected parameter to the transmitting apparatus.

According to another aspect of the present invention, a computer readable medium having computer readable code implements a method of receiving data, the method including: receiving a pilot signal to which a beamforming matrix is applied from a transmitting apparatus, estimating a beamforming channel matrix which is a channel matrix generated at a time when the transmitting apparatus applies the beamforming matrix to the pilot signal and then transmits the pilot signal to a receiving apparatus; selecting a parameter to be used while transmitting a data signal based on the beamforming channel matrix and noise information included in the pilot signal; and transmitting the selected parameter to the transmitting apparatus.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
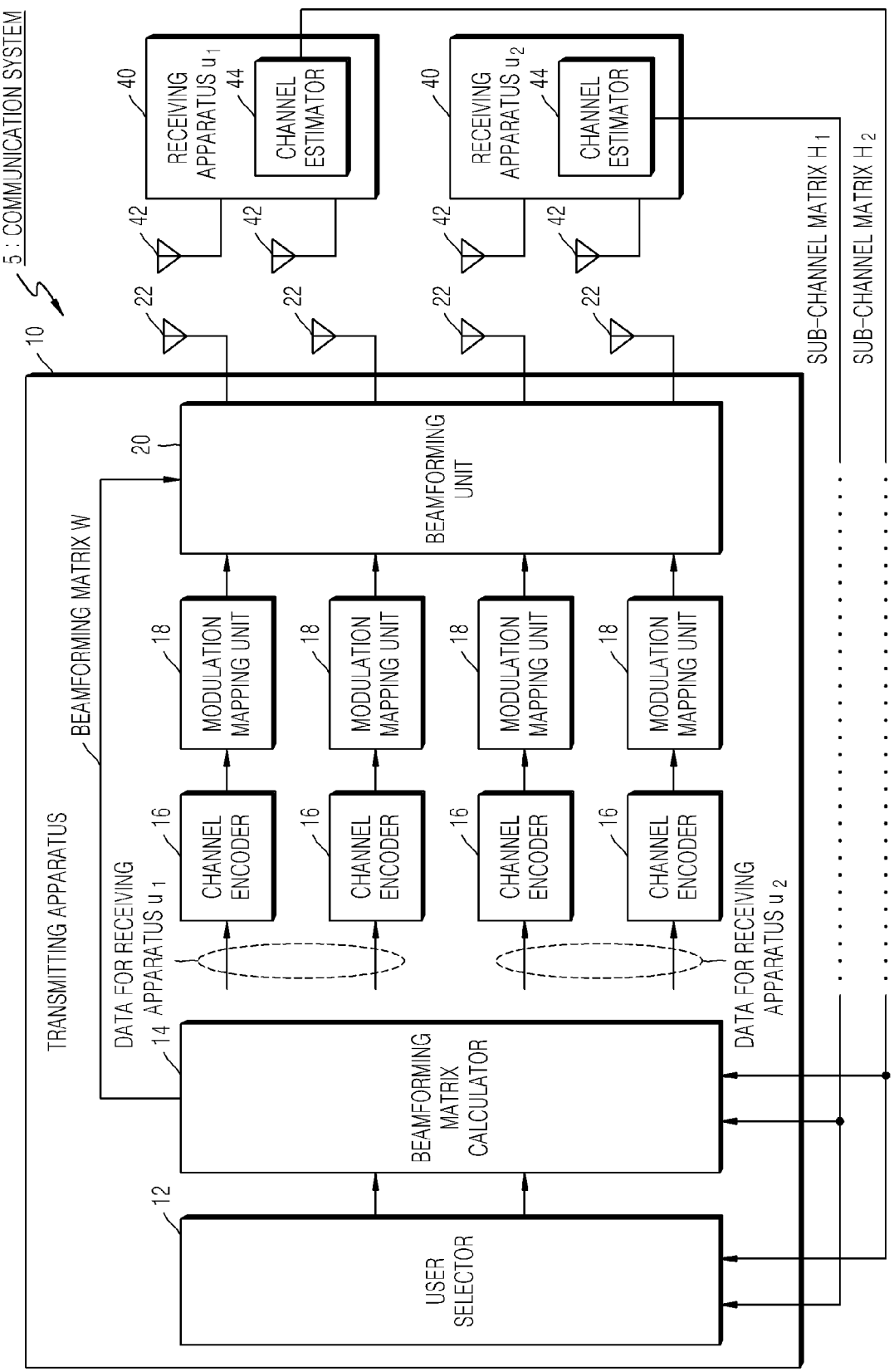
FIG. 1 illustrates a communication system related to a multi user multiple-input and multiple-output (MIMO) method.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

FIG. 1 illustrates a communication system 5 related to a multi user multiple-input and multiple-output (MIMO) method. Referring to FIG. 1, the communication system 5 includes a transmitting apparatus 10 and a plurality of receiving apparatuses $u_1$ and $u_2$ 40. The communication system 5 is an example of a multi user MIMO system using zero-forcing beamforming. It is understood that more than two receiving apparatuses 40 may be used according to other aspects of the present invention.

Each of the receiving apparatuses 40 includes a channel estimator 44 and antennas 42. The channel estimator 44 estimates a sub-channel matrix, which indicates a transmission characteristic of a sub-channel between the transmitting apparatus 10 and the receiving apparatus 40. The sub-channel exists in each receiving apparatus 40 that communicates with the transmitting apparatus 10. A channel matrix shows a transmission characteristic of a channel in a matrix, and a sub-channel matrix is a channel matrix corresponding to a combination of a transmission antenna and a reception antenna. For example, the channel estimator 44 may estimate a sub-channel matrix by using a pilot signal added to a transmission signal transmitted from the transmitting apparatus 10, although it is understood that the channel estimator 44 may also estimate the sub-channel matrix from other information instead of a pilot signal. Also, the receiving apparatus 40 feeds back the sub-channel matrix estimated by the channel estimator 44 to the transmitting apparatus 10.

The transmitting apparatus 10 includes a user selector 12, a beamforming matrix calculator 14, a channel encoder 16, a modulation mapping unit 18, a beamforming unit 20, and a plurality of antennas 22. Although four antennas 22 are shown in FIG. 1, it is understood that more or less than four antennas 22 may be used according to other aspects of the present invention.

The user selector 12 selects a combination of receiving apparatuses 40 in order to simultaneously transmit signals to the receiving apparatuses 40 so that predicted channel capacity, after beamforming, is maximized by using the sub-channel matrix fed back from each receiving apparatus 40. The channel capacity is the maximum speed of a signal that can be transmitted through a channel without an error. Hereinafter, the receiving apparatus 40 may also be referred to as a "user."

The term "beamforming" in an example embodiment of the present invention refers to a concept where, during communication using a MIMO method, singular vectors calculated from each sub-channel matrix are applied to a transmission symbol vector indicating a transmission signal. Here, a matrix formed by using the singular vectors is a beamforming matrix W. Also, when a channel matrix formed of sub-channel matrices is applied to the result of applying a beamforming matrix W to a transmission symbol vector, a beamforming channel matrix is calculated. In terms of a transmission signal, after beamforming is applied to the transmission signal, a beamforming channel matrix is a new channel matrix in which a beamforming matrix W is applied to a channel matrix.

Referring to Equations 1 through 8 below, a beamforming channel matrix G is obtained by using a channel matrix H and a beamforming matrix W corresponding to a signal that is to be transmitted. Zero-forcing beamforming is beamforming by using singular vectors corresponding to a singular value 0 in regards to each sub-channel matrix.

The beamforming matrix calculator 14 calculates a beamforming matrix W based on the sub-channel matrix fed back from each receiving apparatus 40. For convenience of description, the number of antennas 22 of the transmitting apparatus 10 is four and the number of antennas 42 of each receiving apparatus 40 is two. However, it is understood that more or less than four antennas 22 and two antennas 42 may be used with the transmitting apparatus 10 and the receiving apparatus 40 according to other aspects of the present invention.

Assuming that two receiving apparatuses 40 (users $u_1$ and $u_2$) are selected by the user selector 12, the beamforming matrix calculator 14 generates a MIMO channel matrix H (Equation 3) in regard to a selected user by using sub-channel matrices $H_1$ and $H_2$ of Equations 1 and 2, which are each fed back from the receiving apparatuses 40 of the users $u_1$ and $u_2$.

$$H_1 = \begin{bmatrix} h_{11} & h_{12} & h_{13} & h_{14} \\ h_{21} & h_{22} & h_{23} & h_{24} \end{bmatrix} \quad \text{Equation 1}$$

$h_{ij}$ (i=1, 2 j=1, 2, 3, 4) denotes a component indicating a channel characteristic between a j-th antenna of the transmitting apparatus 10 illustrated in FIG. 1 and an i-th antenna of the receiving apparatus $u_1$.

$$H_2 = \begin{bmatrix} h_{31} & h_{32} & h_{33} & h_{34} \\ h_{41} & h_{42} & h_{43} & h_{44} \end{bmatrix} \quad \text{Equation 2}$$

$h_{ij}$ (i=3, 4 j=1, 2, 3, 4) denotes a component indicating a channel characteristic between a j-th antenna of the transmitting apparatus 10 of FIG. 1 and an i-th antenna of the receiving apparatus $u_2$.

$$H = [H_1^T, H_2^T] \quad \text{Equation 3}$$

-continued $$= \begin{bmatrix} h_{11} & h_{12} & h_{13} & h_{14} \\ h_{21} & h_{22} & h_{23} & h_{24} \\ h_{31} & h_{32} & h_{33} & h_{34} \\ h_{41} & h_{42} & h_{43} & h_{44} \end{bmatrix}$$

H denotes a channel matrix wherein a sub-channel matrix between the transmitting apparatus 10 and the receiving apparatus $u_1$ and a sub-channel matrix between the transmitting apparatus and the receiving apparatus $u_2$ are combined. Here, a superscript T is a symbol indicating a transpose matrix.

Then, the beamforming matrix calculator 14 performs singular value decomposition on the sub-channel matrix $H_2$ of the user $u_2$. The singular value decomposition is a method of decomposing a rectangular matrix, wherein a predetermined rectangular matrix is decomposed by using a unitary matrix and a matrix whose diagonal elements are non-negative numbers and whose non-diagonal elements are 0.

Similarly, the beamforming matrix calculator 14 performs singular value decomposition on the sub-channel matrix $H_1$ of the user $u_1$ as shown in Equation 5. Then, the beamforming matrix calculator 14 extracts a plurality of right-singular vectors corresponding to a singular value 0 for each of the sub-channel matrices ($H_1$ and $H_2$). The right-singular vector of the sub-channel matrix $H_2$ corresponding to the singular value 0 is a null space vector 0 of the sub-channel matrix $H_2$. x becomes a null space vector of the sub-channel matrix $H_2$ when $H_2 * x = 0$. Accordingly, interchannel interference of the receiving apparatus 40 of the user $u_2$ due to a signal of the user $u_1$ can be removed by using a matrix $V_2^{(0)}$ formed by the right-singular vector of the sub-channel matrix $H_2$ corresponding to the singular value 0 as a beamforming matrix W of the user $u_1$.

Similarly, the right-singular vector of the sub-channel matrix $H_1$ becomes a null space vector of the sub-channel matrix $H_1$. Accordingly, interchannel interference of the receiving apparatus 40 of the user $u_1$ due to a signal of the user $u_2$ can be removed by using a matrix $V_1^{(0)}$ formed by the right-singular vector of the sub-channel matrix $H_1$ corresponding to the singular value 0 as a beamforming matrix W of the user $u_2$.

Here, a superscript H is a symbol for a Hermitian codomain. In the Hermitian codomain, a complex number of a transposed matrix component is substituted by a conjugate complex number.

$$H_2 = U_2[D_2,0][V_2^{(1)}V_2^{(0)}]^H \qquad \text{Equation 4}$$

$U_2$ denotes a unitary matrix corresponding to the sub-channel matrix $H_2$. The unitary matrix denotes a matrix that satisfies $U*U=E$, where E is a unit matrix. $D_2$ denotes a diagonal matrix that diagonally has singular values obtained by singular value-decomposing the sub-channel matrix $H_2$. The matrix $V_2^{(0)}$ is a matrix formed by the right-singular vector of the sub-channel matrix $H_2$ corresponding to the singular value 0. The matrix $V_2^{(1)}$ is a matrix formed by the right-singular vector of the sub-channel matrix $H_2$ that corresponds to a singular value excluding 0. Here, a superscript H is a symbol for a Hermitian codomian. For example, when the sub-channel matrix $H_2$ is a 2*4 matrix, $U_2$ is a 2*2 matrix, $D_2$ is a 2*2 matrix, 0 is a 2*2 zero matrix, $[D_2,0]$ is a 2*4 matrix, and $[V_2^{(1)},V_2^{(0)}]^H$ is a 4*4 matrix.

$$H_1 = U_1[D_1,0][V_1^{(1)}V_1^{(0)}]^H \qquad \text{Equation 5}$$

$U_1$ denotes a unitary matrix corresponding to the sub-channel matrix $H_1$. $D_1$ denotes a diagonal matrix diagonally having singular values obtained by singular value-decomposing the sub-channel matrix $H_1$. The matrix $V_1^{(0)}$ is a matrix formed by a right-singular vector of the sub-channel matrix $H_1$ corresponding to the singular value 0. The matrix $V_1^{(1)}$ is a matrix formed by a right-singular vector of the sub-channel matrix $H_1$ corresponding to a singular vector excluding 0.

The beamforming matrix calculator 14 generates a beamforming matrix W by using the matrices $V_1^{(0)}$ and $V_2^{(0)}$ respectively obtained by singular-value decomposing the sub-channel matrices $H_1$ and $H_2$ as shown in Equation 6. Then, the beamforming matrix calculator 14 transmits the generated beamforming matrix W to the beamforming unit 20.

$$W = [V_2^{(0)}, V_1^{(0)}] \qquad \text{Equation 6}$$

Each of the channel encoders 16 encodes data transmitted to a respective receiving apparatus 40 based on a predetermined channel encoding rate. Also, each channel encoder 16 transmits the encoded data to the modulation mapping unit 18. Although four channel encoders 16 are shown in FIG. 1, it is understood that more or less than four channel encoders 16 may be used according to other aspects of the present invention.

Each of the modulation mapping unit 18 generates the transmission symbol vector by modulation-mapping the data obtained from a respective channel encoder 16 based on a predetermined modulation order. Then, each modulation mapping unit 18 transmits the generated transmission symbol vector to the beamforming unit 20. Hereinafter, a transmission symbol vector transmitted in regards to the user $u_1$ is denoted as $s_1 = [s_{11}, s_{12}]^T$ and a transmission symbol vector transmitted in regards to the user $u_2$ is denoted as $s_2 = [s_{21}, s_{22}]^T$. Although four modulation mapping units 18 are shown in FIG. 1, it is understood that more or less than four modulation mapping units 18 may be used according to other aspects of the present invention.

The beamforming unit 20 generates a transmission symbol vector after the beamforming by adding up the transmission symbol vectors for each user obtained from the modulation mapping units 18 and the beamforming matrix W generated by the beamforming matrix calculator 14. When the transmission symbol vectors $s_1$ and $s_2$ of the users $u_1$ and $u_2$ are added up and denoted as $s = [s_1^T, s_2^T]^T$, a reception signal vector ($r = [r_1^T, r_2^T]^T$) can be expressed as a multiplication of the channel matrix H, the beamforming matrix W, and the transmission symbol vector s as shown in Equation 7. Also, since the beamforming matrix W is generated as shown in Equation 6, an interference component between users is 0 as shown in Equation 7. Here, $r_1 = [r_{11}, r_{12}]^T$ and $r_2 = [r_{21}, r_{22}]^T$.

$$r = HWs = \begin{bmatrix} g_{11} & g_{12} & 0 & 0 \\ g_{21} & g_{22} & 0 & 0 \\ 0 & 0 & g_{33} & g_{34} \\ 0 & 0 & g_{43} & g_{44} \end{bmatrix} \begin{bmatrix} s_{11} \\ s_{12} \\ s_{13} \\ s_{14} \end{bmatrix} \qquad \text{Equation 7}$$

As described above, the transmitting apparatus 10 calculates the beamforming matrix W by using the null space vector obtained by singular value-decomposing the sub-channel matrix fed back from each receiving apparatus 40, and transmits the beamforming matrix W after adding the beamforming matrix W with the transmission symbol vector s. Accordingly, the beamforming matrix W can be transmitted in such a way that the beamforming matrix W does not interfere with the users. This is conceptually illustrated in FIG. 2.

Figure 2:
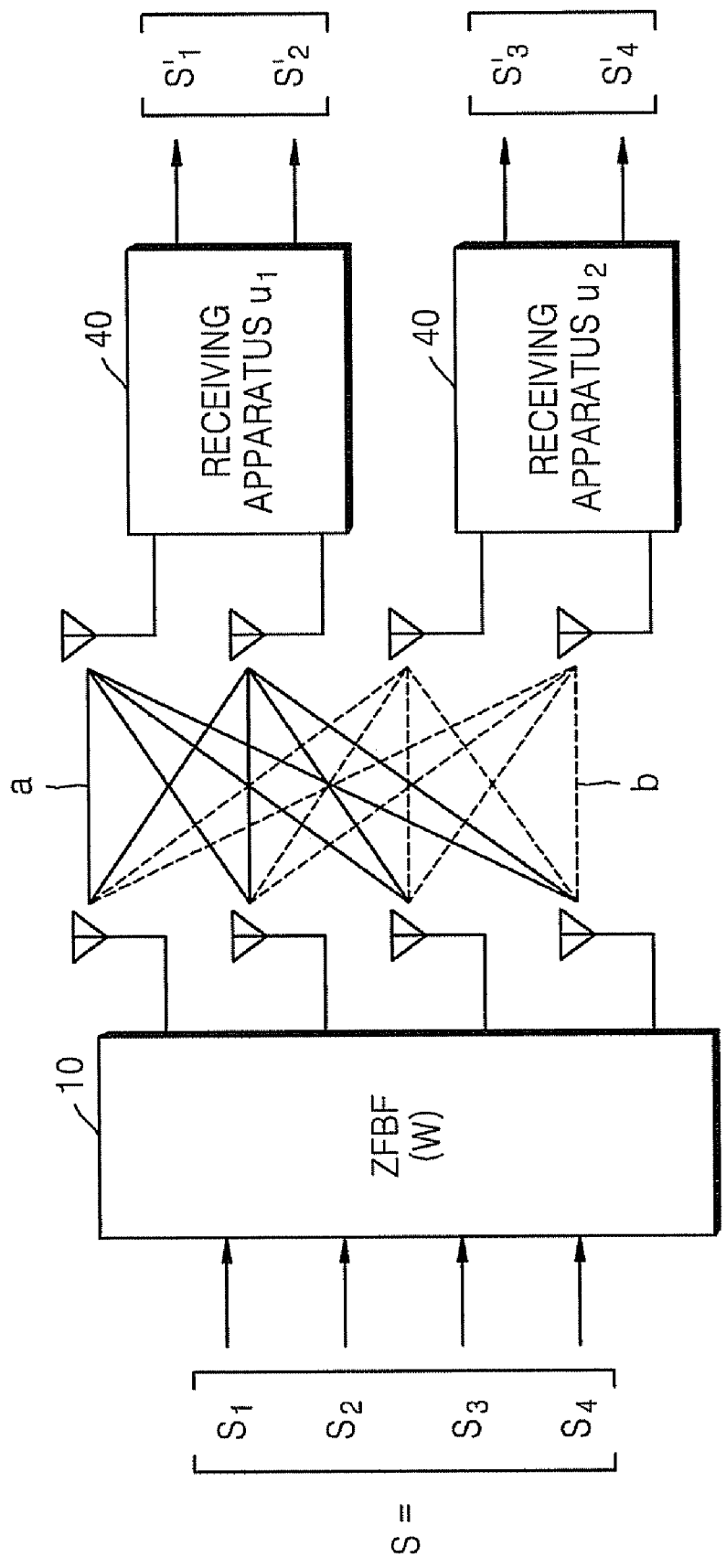
FIG. 2 illustrates a zero-forcing beamforming technology.

FIG. 2 illustrates a zero-forcing beamforming technology. As illustrated in FIG. 2, by transmitting a multiplication of a transmission symbol vector s and a zero-forcing beamforming (ZFBF) matrix W, channels that arrive at receiving apparatuses $u_1$ and $u_2$ 40 are each regarded as independent sub-channels a and b. Accordingly, the transmission symbol vector s' at each receiving apparatus 40, such as $s'_1$ at the first receiving apparatus $u_1$, can be detected with high precision.

Figure 3:
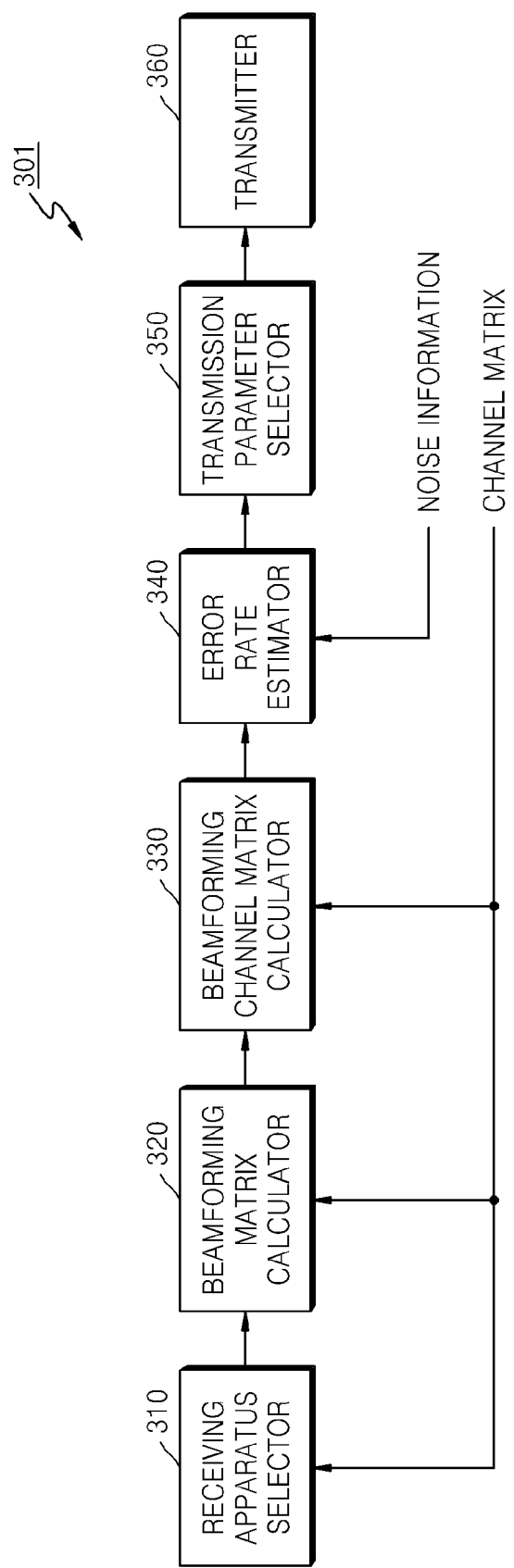
FIG. 3 illustrates a transmitting apparatus using beamforming according to an embodiment of the present invention.

FIG. 3 illustrates a transmitting apparatus 301 which uses beamforming according to an embodiment of the present invention. Referring to FIG. 3, the transmitting apparatus 301 includes a receiving apparatus selector 310, a beamforming matrix calculator 320, a beamforming channel matrix calculator 330, an error rate estimator 340, a transmission parameter selector 350, and a transmitter 360.

The receiving apparatus selector 310 selects a combination of receiving apparatuses 40 (FIG. 1) in such a way that predicted channel capacity after beamforming is maximized, by using a channel matrix between each receiving apparatus 40 and the transmitting apparatus 301 fed back from each receiving apparatus 40. Here, the channel matrix corresponding to each receiving apparatus 40 is fed back from each receiving apparatus 40.

The beamforming matrix calculator 320 calculates a beamforming matrix W based on the channel matrix. The beamforming channel matrix calculator 330 calculates a beamforming channel matrix which shows a channel characteristic after beamforming between the transmitting apparatus 301 and one of the receiving apparatuses 40. The beamforming channel matrix is a matrix that shows a channel characteristic when a signal is transmitted from the transmitting apparatus 301 to one of the receiving apparatuses 40 after beamforming the signal. The beamforming channel matrix calculator 330 calculates the beamforming channel matrix based on the beamforming matrix W calculated by the beamforming matrix calculator 320 and the channel matrix fed back from each receiving apparatus 40. The beamforming channel matrix calculator 330 performs singular value decomposition on the channel matrix that shows a channel characteristic between the transmitting apparatus 301 and one of the receiving apparatuses 40, and calculates the beamforming channel matrix by using the beamforming matrix W, which includes a null space vector corresponding to a singular value 0 obtained as a result of the singular value decomposition, and the channel matrix. The beamforming channel matrix calculated by the beamforming matrix calculator 320 is block-diagonalized according to each channel as shown in Equation 7.

The error rate estimator 340 estimates an error rate that occurs while transmitting the signal after the beamforming, by using the beamforming channel matrix calculated by the beamforming channel matrix calculator 330. The error rate estimator 340 estimates the error rate by using noise information, which is included while transmitting the signal after the beamforming, and received power, which is estimated from the beamforming channel matrix. According to an aspect of the present invention, the error rate is a signal power to interference plus noise power ratio (SINR), although it is understood that the error rate is not limited to being an SINR and may instead be other types of error rates known in the art. The error rate estimator 340 estimates the error rate based on SINR at each sub-stream corresponding to each block of the block-diagonalized beamforming channel matrix. The error rate estimator 340 calculates the minimum Euclid distance at each selectable modulation order of each block of the block-diagonalized beamforming channel matrix, and calculates SINR at each sub-stream based on the result of calculating the minimum Euclid distance.

The transmission parameter selector 350 selects parameters used while transmitting the signal so that the error rate is below a predetermined value. According to an aspect of the present invention, the parameters include a channel encoding rate used while channel-encoding a transmission signal and a modulation order used while modulation-mapping the transmission signal. It is understood that the channel encoding rate and the modulation order may be used individually or in combination, and that other aspects of the present invention may use different parameters altogether. The transmission parameter selector 350 sets up a transmission rate between the transmitting apparatus 301 and one of the receiving apparatuses by using the selected parameters. Examples of such parameters include a channel encoding rate, a modulation order, etc.

The transmitter 360 transmits a data signal by using the parameters selected by the transmission parameter selector 350. The transmitter 360 may transmit the data signal wirelessly, through a wired connection, or through a combination of both wireless and wired connections.

Figure 4:
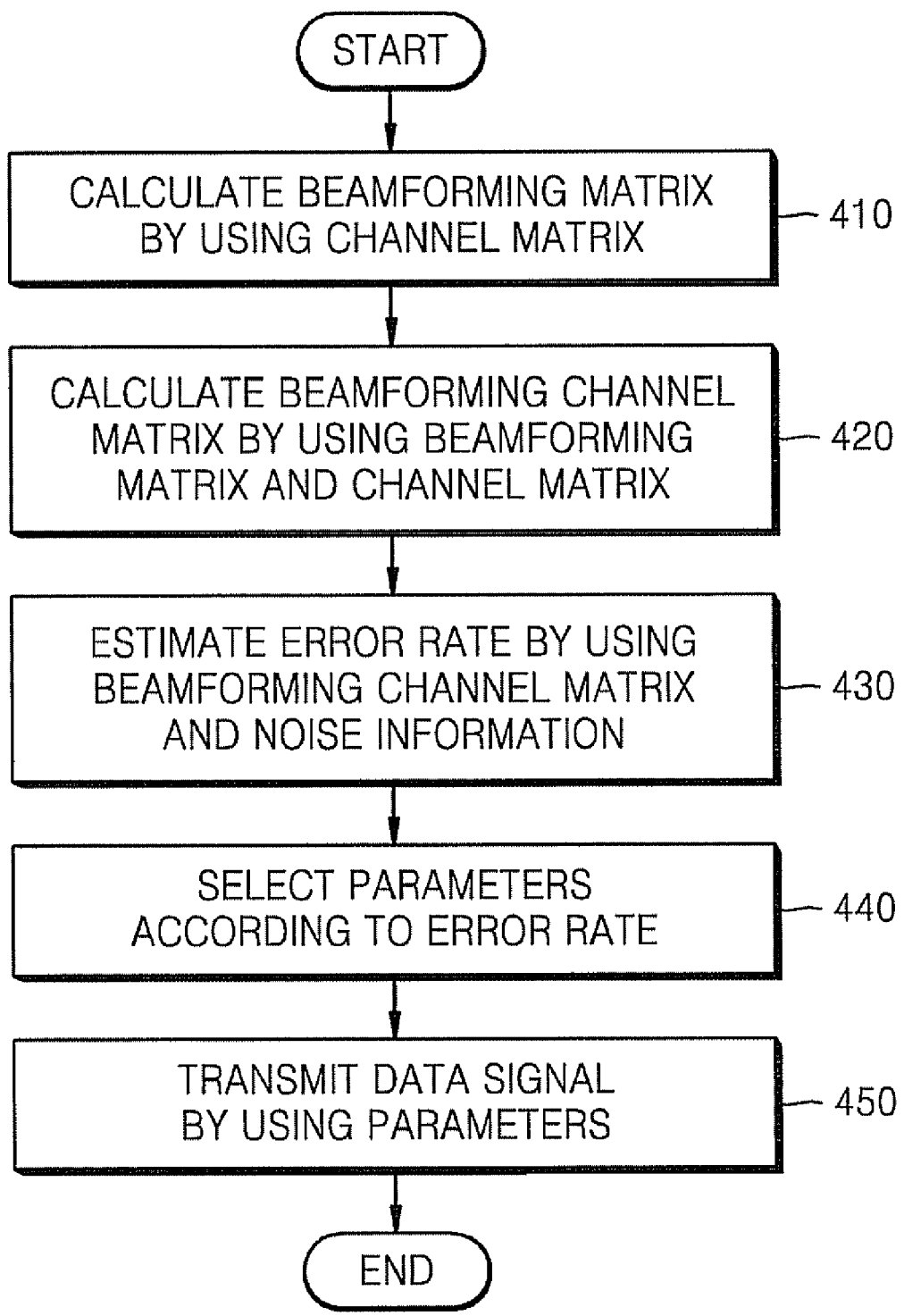
FIG. 4 illustrates a transmitting method using beamforming according to an embodiment of the present invention.

FIG. 4 illustrates a transmitting method using beamforming according to an embodiment of the present invention. Referring to FIG. 4, the transmitting method includes operations that are sequentially performed in the transmitting apparatus 301 of FIG. 3. Accordingly, even if the transmitting method is not described in complete detail, the description about the transmitting apparatus 301 of FIG. 3 can be applied to the transmitting method of FIG. 4.

In operation 410, the transmitting apparatus 301 calculates a beamforming matrix W based on channel matrices that show channel characteristics between the transmitting apparatus 301 and a plurality of receiving apparatuses 40. In operation 420, the transmitting apparatus W calculates a beamforming channel matrix based on the beamforming matrix W calculated in operation 410 and channel matrices received from the receiving apparatuses 40.

In operation 430, the transmitting apparatus 301 estimates an error rate that occurs while the receiving apparatus 40 receives a signal, by using the beamforming channel matrix calculated in operation 420 and noise information received from the receiving apparatus 40. In operation 440, the transmitting apparatus 301 selects parameters used to transmit a data signal to the receiving apparatus 40 according to the error rate estimated in operation 430.

In operation 450, the transmitting apparatus 301 transmits the data signal by using the parameters selected in operation 440.

Figure 5:
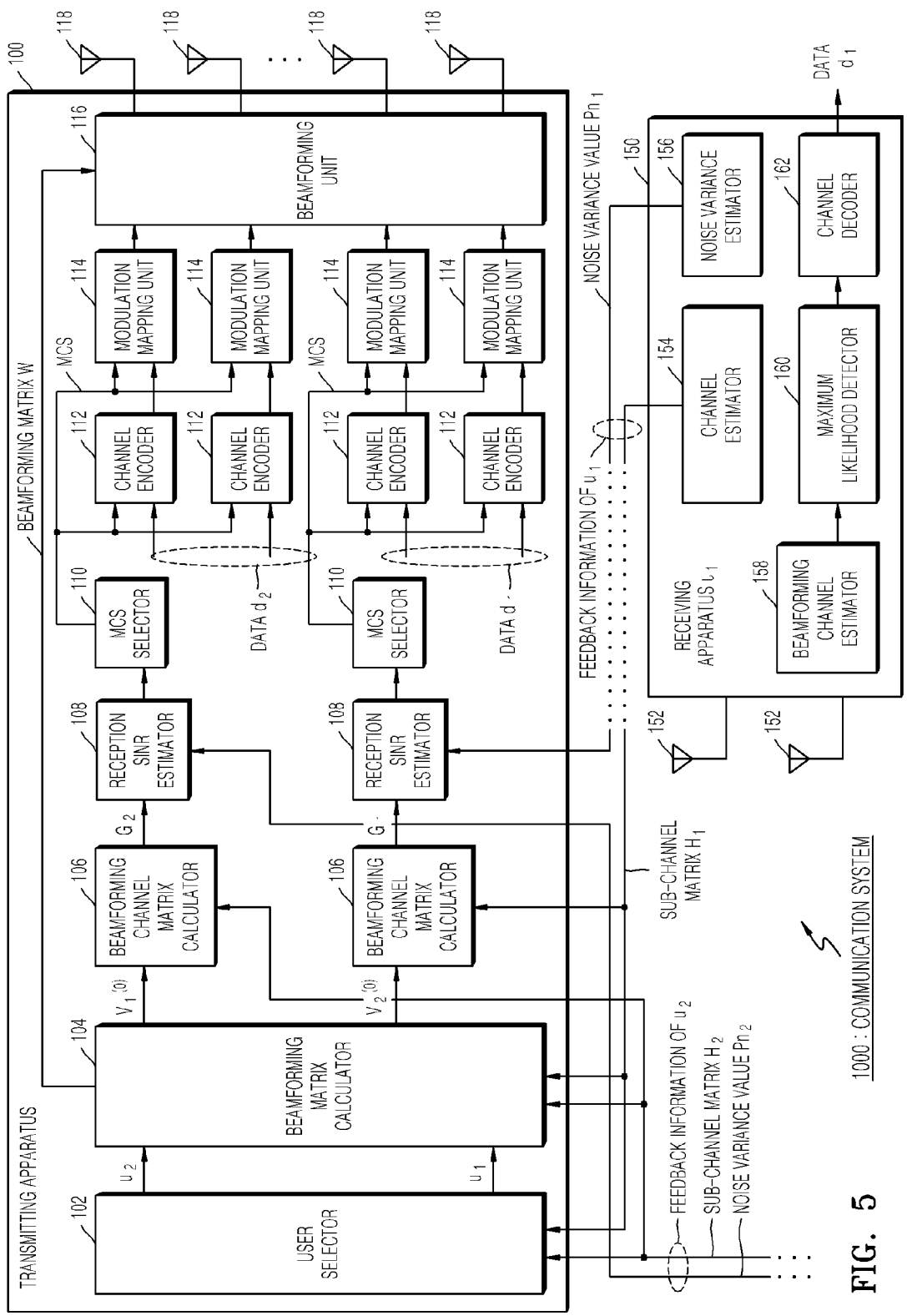
FIG. 5 illustrates a communication system according to an embodiment of the present invention.

FIG. 5 illustrates a communication system 1000 according to an embodiment of the present invention. According to the communication system 1000, a transmitting apparatus 100 estimates a reception SINR based on a sub-channel matrix, which is fed back from a receiving apparatus 150, and a noise variance value (or a noise power value), and selects a modulation order and a channel encoding rate based on the estimated reception SINR.

As illustrated in FIG. 5, the communication system 1000 includes the transmitting apparatus 100 and the receiving apparatus 150. Although only one receiving apparatus $u_1$ 150 is illustrated in FIG. 5, it is assumed that there are a plurality of receiving apparatuses 150, as indicated by the separate data stream being transmitted from a receiving apparatus $u_2$ to the transmitting apparatus 100 in the lower-left corner of FIG. 5. Also, the number of antennas 152 of the receiving apparatus $u_1$ 150 shown in FIG. 5 is two, but the number of antennas 152 is not limited thereto and may be more or less than two according to other aspects of the present invention.

As illustrated in FIG. 5, the receiving apparatus 150 includes a plurality of antennas 152, a channel estimator 154, a noise variance estimator 156, a beamforming channel estimator 158, a maximum likelihood detector 160, and a channel decoder 162.

The channel estimator 154 estimates a sub-channel matrix that shows a transmission characteristic of a sub-channel between the transmitting apparatus 100 and the receiving apparatus 150. For example, the channel estimator 154 may estimate a sub-channel matrix by using a pilot signal added to a transmission signal by the transmitting apparatus 100, although it is understood that the channel estimator 154 may instead use other types of information to estimate a sub-channel matrix according to other aspects of the present invention. The receiving apparatus 150 transmits the estimated sub-channel matrix to the transmitting apparatus 100.

The noise variance estimator 156 estimates a noise variance value (or a noise power value) by using the pilot signal. Then, the receiving apparatus 150 transmits the estimated noise variance value to the transmitting apparatus 100.

The beamforming channel estimator 158 estimates a sub-channel matrix of the transmission signal on which beamforming is performed. A reception signal vector r is obtained by multiplying a transmission symbol vector s by a result HW of multiplying a channel matrix H and a beamforming matrix W as expressed in Equation 7. Also, a channel matrix (G=HW), which is generated after the beamforming estimated by the sub-channel matrix, is block-diagonalized at each sub-channel as shown in Equation 7 or 8. For example, in the case of the receiving apparatus 150 of a user $u_1$, the beamforming channel estimator 158 estimates a sub-channel matrix $G_1$ which is included in the channel matrix G after the beamforming and corresponds to the user $u_1$. The beamforming channel estimator 158 transmits the estimated sub-channel matrix $G_1$ to the maximum likelihood detector 160.

$$G = HW = \begin{bmatrix} G_1 & 0 \\ 0 & G_2 \end{bmatrix} \qquad \text{Equation 8}$$

The maximum likelihood detector 160 separates a reception signal by using information, such as information on the modulation order, notified by the transmitting apparatus 100, and the sub-channel matrix after the beamforming estimated by the beamforming channel estimator 158, and detects a transmission symbol transmitted to the receiving apparatus 150. According to an aspect of the present invention, the maximum likelihood detector 160 uses a maximum likelihood detection (MLD) method, which has superior transmission characteristics compared to a minimum mean square error (MMSE) detection method, as a signal separation algorithm. It is understood, however, that the maximum likelihood detector 160 is not limited to using the MLD method, and may instead use various other types of detection methods, including the MMSE method. Also, the maximum likelihood detector 160 transmits the transmission symbol detected at each sub-stream to the channel decoder 162.

The channel decoder 162 decodes the original data by performing decoding of error correction based on information, such as information on a channel encoding rate, notified by the transmitting apparatus 100. It is understood that the channel decoder 162 may also use other parameters, such as a modulation order, instead of or in addition to a channel encoding rate, to decode the original data.

As illustrated in FIG. 5, the transmitting apparatus 100 includes a user selector 102, a beamforming matrix calculator 104, a beamforming channel matrix calculator 106, a reception SINR estimator 108, a modulating and coding set (MCS) selector 110, a channel encoder 112, a modulation mapping unit 114, a beamforming unit 116, and a plurality of antennas 118.

The user selector 102 selects a combination of receiving apparatuses 150 to which the user selector 102 will simultaneously transmit a signal, so that estimated channel capacity after the beamforming is maximized by using sub-channel matrices $H_1$ and $H_2$ fed back from each of the receiving apparatuses 150. The user selector 102 transmits information about the combination of the selected receiving apparatuses 150 to the beamforming matrix calculator 104. Also, for convenience of description, the receiving apparatuses 150 of users $u_1$ and $u_2$ are selected. However, the transmitting apparatus 100 is not limited thereto, and may instead transmit a signal to more or less than the two users $u_1$ and $u_2$.

The beamforming matrix calculator 104 calculates a beamforming matrix W which enables data signals to be transmitted to the receiving apparatuses 150 without interfering with each other by using the sub-channel matrices $H_1$ and $H_2$ fed back from the receiving apparatuses 150 selected by the user selector 102.

In detail, the beamforming matrix calculator 104 singular value-decomposes the sub-channel matrix $H_2$ of the user $u_2$ as shown in Equation 4. Similarly, the beamforming matrix calculator 104 singular value-decomposes the sub-channel matrix $H_1$ of the user $u_1$ as shown in Equation 5. Also, the beamforming matrix calculator 104 extracts a plurality of right-singular vectors corresponding to a singular value 0 in regard to each of the sub-channel matrices $H_1$ and $H_2$. Also, as shown in Equation 6, the beamforming matrix calculator 104 generates a beamforming matrix W by using matrices $V_1^{(0)}$ and $V_2^{(0)}$ obtained by singular value-decomposing each of the sub-channel matrices $H_1$ and $H_2$.

Then, the beamforming matrix calculator 104 transmits the generated beamforming matrix W to the beamforming unit 116 and simultaneously transmits the matrices $V_1^{(0)}$ and $V_2^{(0)}$ formed by the right-singular vector corresponding to the singular value 0 to the beamforming channel matrix calculator 106. For example, the beamforming matrix calculator 104 transmits the matrix $V_2^{(0)}$ to the beamforming channel matrix calculator 106, which calculates the beamforming channel matrix $G_1$ corresponding to the user $u_1$.

The beamforming channel matrix calculator 106 calculates an assumed beamforming channel matrix G by adding up the beamforming matrix W obtained from the beamforming matrix calculator 104 and the channel matrix H in regard to the combination selected by the user selector 102. Here, when a beamforming channel matrix $G_2$ corresponding to the sub-channel matrix $H_2$ is calculated, one of the beamforming channel matrix calculators 106 calculates the beamforming channel matrix $G_2$ by using the matrix $V_1^{(0)}$ obtained from the beamforming matrix calculator 104 and the sub-channel matrix $H_2$ obtained from the receiving apparatus 150 of the user $u_2$. The beamforming channel matrix $G_1$ is calculated in a similar manner. The sub-matrices $G_1$ and $G_2$ of the beamforming channel matrix G are equivalent channel matrices of the receiving apparatuses 150 of the selected users $u_1$ and $u_2$. In other words, the sub-matrices $G_1$ and $G_2$ of the beamforming channel matrix G become channel matrices of each receiving apparatus 150 after the beamforming.

The reception SINR estimators 108 calculate reception powers by using the respective beamforming channel matrices $G_1$ and $G_2$ obtained from the beamforming channel matrix calculators 106. Also, the reception SINR estimators 108 estimate SINRs detected from the receiving apparatus 150 by using the noise variance value (or noise power) fed back from the receiving apparatus 150 and the reception power calculated from the beamforming channel matrices $G_1$ and $G_2$. Then, the reception SINR estimators 108 transmit information about the estimated SINRs for the respective beamforming channel matrices $G_1$ and $G_2$ to corresponding MCS selectors 110. For example, one of the reception SINR estimator 108 may estimate the average SINR detected from the receiving apparatus 150 of the user $u_2$ by using the beamforming channel matrix $G_2$ and the noise variance value $Pn_2$ fed back from the receiving apparatus 150 of the user $u_2$. It is understood, however, that the reception SINR estimator 108 is not limited to using the noise variance value $Pn_2$ fed back from the receiving apparatus 150 of the user $u_2$, and may instead use other values instead of or in addition to the noise variance value $Pn_2$.

The MCS selectors 110 respectively determine an MCS (modulating and coding set) based on the estimated SINR of each receiving apparatus 150 obtained from the respective reception SINR estimators 108. For example, one of the MCS selectors 110 selects a channel encoding rate and modulation order of an error correction code in which the error rate is below a predetermined value and the transmission speed is the maximum. Then, the MCS selector 110 transmits information about the selected channel encoding rate to the channel encoder 112, and simultaneously transmits information about the selected modulation order to the modulation mapping unit 114.

Each of the channel encoders 112 encodes data based on the channel encoding rate selected by the corresponding MCS selector 110. Then, the channel encoder 112 transmits the encoded data to the modulation mapping unit 114. Although FIG. 5 illustrates two channel encoders 112 for each MCS selector 110, it is understood that the transmitting apparatus 100 may instead have a ratio of more or less than two channel encoders 112 for each MCS selector 110 according to other aspects of the present invention.

Each of the modulation mapping units 114 modulation-maps a respective group of the encoded data based on the selected modulation order. Also, each of the modulation mapping units 114 transmits a transmission symbol obtained by modulation-mapping the respective groups of encoded data to the beamforming unit 116. For example, data $d_2$ transmitted to the receiving apparatus 150 of the user $u_2$ is converted in series and in parallel, encoded by the channel encoder 112, modulation-mapped by the modulation mapping unit 114, and then converted as a transmission symbol vector ($s_2=[s_{21}, s_{22}]$) to the user $u_2$. Also, a user indicated by a control signal included in a transmission signal format, is notified about the information on the selected modulation order and channel encoding rate.

The beamforming unit 116 generates a transmission symbol vector s' after the beamforming by adding up each of the transmission symbol vectors $s_1$ and $s_2$ obtained from the modulation mapping unit 114 and the beamforming matrix W generated by the beamforming matrix calculator 104. Also, the beamforming unit 116 transmits the transmission symbol vector s' to the receiving apparatus 150 through each antenna 118.

The communication system 1000 has been described above. According to the communication system 1000, a sub-channel matrix of each receiving apparatus 150 is calculated in the transmitting apparatus 100. Thus, the SINR detected in the receiving apparatus 150 is estimated based on each sub-channel matrix. As a result, the transmitting apparatus 100 transmits a suitable error correction encoding rate and modulation order based on the estimated SINR, thereby obtaining a stable throughput, i.e., data transfer rate, without depending on channel circumstances. Also, since most of the processes of setting up a transmission rate are performed in the transmitting apparatus 100, power consumed by the receiving apparatus 150 is reduced. In addition, a transmission control parameter, such as an encoding rate or a modulation order, is transmitted to the receiving apparatus 150 by being included in a transmission signal.

Figure 6:
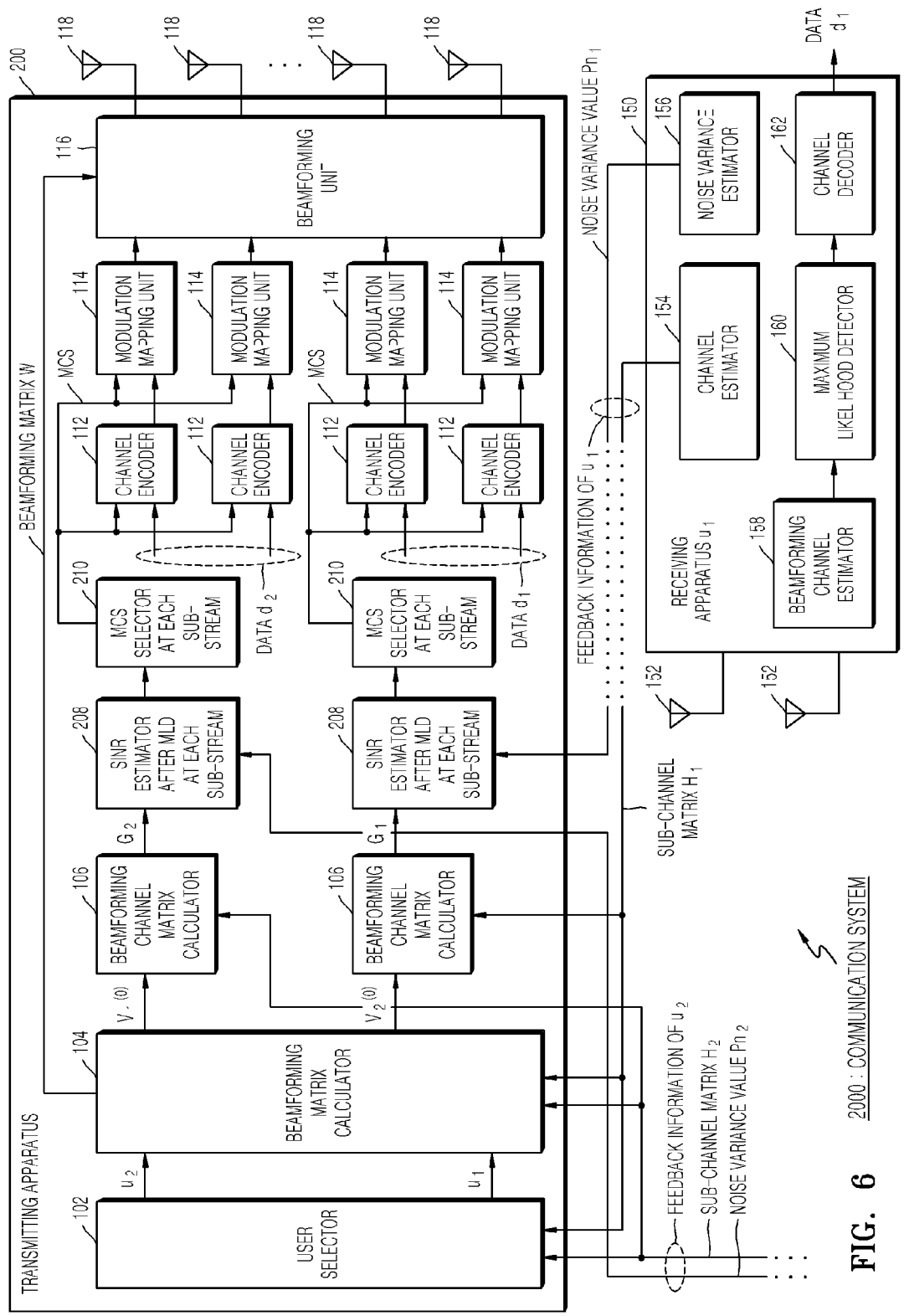
FIG. 6 illustrates a communication system according to another embodiment of the present invention.

FIG. 6 illustrates a communication system 2000 according to another embodiment of the present invention. The communication system 2000 estimates SINRs after a MLD (maximum likelihood detection) estimation operation is performed at each sub-stream of the transmitting apparatus 200 based on a sub-channel matrix and a noise variance value fed back from the receiving apparatus 150, and selects a modulation order and a channel encoding rate based on the SINR after a MLD is estimated for each sub-stream. Also, like reference numerals denote like elements in the communication systems 1000 and 2000, and thus descriptions of the same elements will not be repeated herein.

As illustrated in FIG. 6, the communication system 2000 includes the transmitting apparatus 200 and the receiving apparatus 150. Although only one receiving apparatus $u_1$ 150 is illustrated in FIG. 6, it is assumed that the communication system 2000 includes a plurality of receiving apparatuses 150, as indicated by the separate data stream being transmitted from a receiving apparatus $u_2$ to the transmitting apparatus 200 in the lower-left corner of FIG. 6.

As illustrated in FIG. 6, the transmitting apparatus 200 includes a user selector 102, a beamforming matrix calculator 104, two beamforming channel matrix calculators 106, two SINR estimators which estimate respective SINRs after an MLD estimation operation is performed for each sub-stream 208, two MCS selectors located at each sub-stream 210, four channel encoders 112, four modulation mapping units 114, a beamforming unit 116, and a plurality of antennas 118. It is understood that the number of components shown in the transmitting apparatus 200 may vary in many different ways, and that FIG. 6 is exemplary only.

Each one of the SINR estimators which estimate respective SINRs after a MLD estimation operation is performed for each sub-stream 208 (hereinafter, referred to as the SINR estimators 208) obtains sub-channel matrices $G_1$ and $G_2$ after a beamforming operation is calculated by the beamforming channel matrix calculator 106, and calculates the minimum Euclid distance at each predetermined modulation order in regard to the sub-channel matrices $G_1$ and $G_2$.

However, it is difficult to estimate the minimum Euclid distance for each sub-stream, and various methods may be used. For example, in one exemplary method, a differential modulation symbol, which is a difference between two different modulation symbols, is calculated in regard to all modulation signal points included in a signal point arrangement of a predetermined modulation method, and a Euclid distance is calculated in regard to each of various differential modulation symbol vectors formed of a combination of differential modulation symbols. Then, a differential modulation symbol vector, wherein the Euclid distance is at a minimum, should be selected from among differential modulation symbol vectors in which the differential modulation symbol corresponding to each sub-stream is not 0. The Euclid distance corresponding to such a differential modulation symbol vector is the minimum Euclid distance.

For example, when a modulation multinary number is M and the number of transmission antennas is $N_T$, the combined number of differential modulation symbol vectors is $M^{\wedge}(N_T)$. Accordingly, when the number of transmission antennas is 4 and a modulation method is 16 QAM (16 quadrature amplitude modulation), a Euclid distance should be calculated in regard to the combination, such as $49^4=5,764,801$, in order to obtain the minimum Euclid distance. As described above, the amount of calculations used to calculate the minimum Euclid distance is massive, and thus such a method is not regarded as being a realistic option.

A solution for such a problem has been developed by the applicant of the present invention, and is disclosed in a patent which the applicant has applied for in the Japanese Patent Office (Japanese patent application no. 2006-282376). Here, the applicant suggests a Trellis search algorithm, where a channel matrix is decomposed (QR decomposition) by a unitary matrix and an upper triangular matrix, a candidate for a differential modulation symbol vector is selected so that a Euclid distance corresponding to each row vector of the upper triangular matrix is small, and a differential modulation symbol is extracted so that the corresponding Euclid distance in a predetermined condition is at a minimum. A Euclid distance corresponding to the differential modulation symbol extracted based on the Trellis search algorithm is the desired minimum Euclid distance. By using the Trellis search algorithm, it is possible to achieve a high speed of approximately 22,500 times faster than a conventional search algorithm, when the number of transmission antennas is 4 and the modulation method is 16 QAM. Accordingly, it becomes a realistic option to calculate the minimum Euclid distance at each sub-stream.

Each of the SINR estimators 208 calculates the minimum Euclid distance for a respective sub-stream by using the Trellis search algorithm in regard to the sub-channel matrices G1 and G2 after the beamforming. Then, each one of the SINR estimators 208 calculates an SINR for a respective sub-stream in regard to the candidate of the predetermined modulation method by using the minimum Euclid distance calculated for the respective sub-stream and the noise variance value fed back from the receiving apparatus 150 of a respective user. Also, the SINR estimators 208 transmit the SINRs of the respective sub-streams to a corresponding one of the MCS selectors located at each sub-stream 210.

The MCS selector at each sub-stream 210 (hereinafter referred to as the "MCS selector 210") predicts a bit error rate or packet error rate after performing an MLD operation and error correction decoding based on the SINR of each sub-stream calculated by the respective SINR estimator 208, and selects an encoding rate and modulation order for each sub-stream in such a way that when the predicted bit error rate or packet error rate is below a predetermined value, the transmission speed is high. Also, the MCS selector 210 transmits the selected encoding rate to the channel encoder 112 and simultaneously transmits the selected modulation order to the modulation mapping unit 114.

Also, the transmitting apparatus 200 notifies the receiving apparatus 150 about information on the selected encoding rate and the modulation order by recording the information in a control signal of a transmission signal format. Then, the MCS selector 210 may select an encoding rate and modulation order of each sub-stream or a common encoding rate and modulation order of the sub-streams. In the former case, one of the channel encoders 112 and one of the modulation mapping units 114 respectively perform the channel encoding and the modulation mapping on a respective sub-stream by using the encoding rate and the modulation order selected by the MCS selector 210. In the latter case, one of the channel encoders 112 and one of the modulation mapping units 114 respectively perform the channel encoding and the modulation mapping on the whole sub-stream by using the encoding rate and the modulation order selected by the MCS selector 210.

The communication system 2000 has been described above. By using the communication system 2000, the transmitting apparatus 200 calculates the sub-channel matrix in regard to each receiving apparatus 150, thereby making it possible to estimate the minimum Euclid distance of each sub-stream detected by the receiving apparatus 150 from each sub-channel matrix. As a result, the transmitting apparatus 200 selects the encoding rate and the modulation order based on the SINR estimated at each sub-stream. Accordingly, stable throughput is obtained without depending on channel conditions. Also, since a transmission control parameter is selected at each sub-channel, more suitable transmission control is possible in regard to the MLD performed by the receiving apparatus 150 in comparison with the receiving apparatus 150 of the communication system 1000. Accordingly, the MLD detection method, which obtains better transmission characteristics than the MMSE detection method, can be applied in the communication system 2000. Moreover, transmission control suitable for the MLD is realized.

Figure 7:
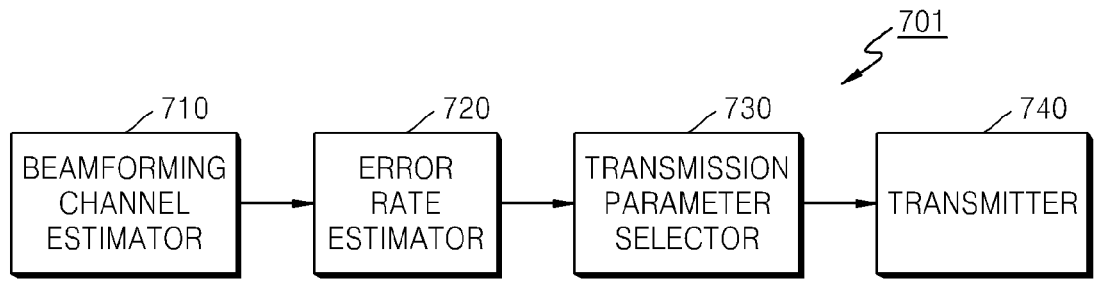
FIG. 7 illustrates a receiving apparatus using beamforming according to an embodiment of the present invention.

FIG. 7 illustrates a receiving apparatus 701 using beamforming according to an embodiment of the present invention. Referring to FIG. 7, the receiving apparatus 701 includes a beamforming channel estimator 710, an error rate estimator 720, a transmission parameter selector 730, and a transmitter 740.

The beamforming channel estimator 710 receives a pilot signal in which beamforming is applied, and calculates a beamforming channel matrix by using the received pilot signal.

The error rate estimator 720 estimates an error rate while transmitting a signal after the beamforming, based on the calculated beamforming channel matrix. The error rate estimator 720 estimates the error rate by using noise information included in the signal after the beamforming and the calculated beamforming channel matrix. The error rate estimator 720 estimates the error rate based on an SINR corresponding to each block of a block-diagonalized beamforming channel matrix. The error rate estimator 720 calculates the minimum Euclid distance at each selectable modulation order of each block of the block-diagonalized beamforming channel matrix, and calculates the SINR of each sub-stream based on the result of calculating the minimum Euclid distance.

The transmission parameter selector 730 selects parameters, which enable the error rate to drop below a predetermined value. According to an aspect of the present invention, the parameters are a channel encoding rate, which is used to channel-encode a transmission signal, and a modulation order, which is used to modulation-map the transmission signal.

The transmitter 740 transmits the selected parameters to a transmitting apparatus which transmitted the pilot signal. According to an aspect of the present invention, the transmitting apparatus is one of the transmitting apparatuses 301, 100, or 200, shown in FIGS. 3, 5, and 6, respectively.

Figure 8:
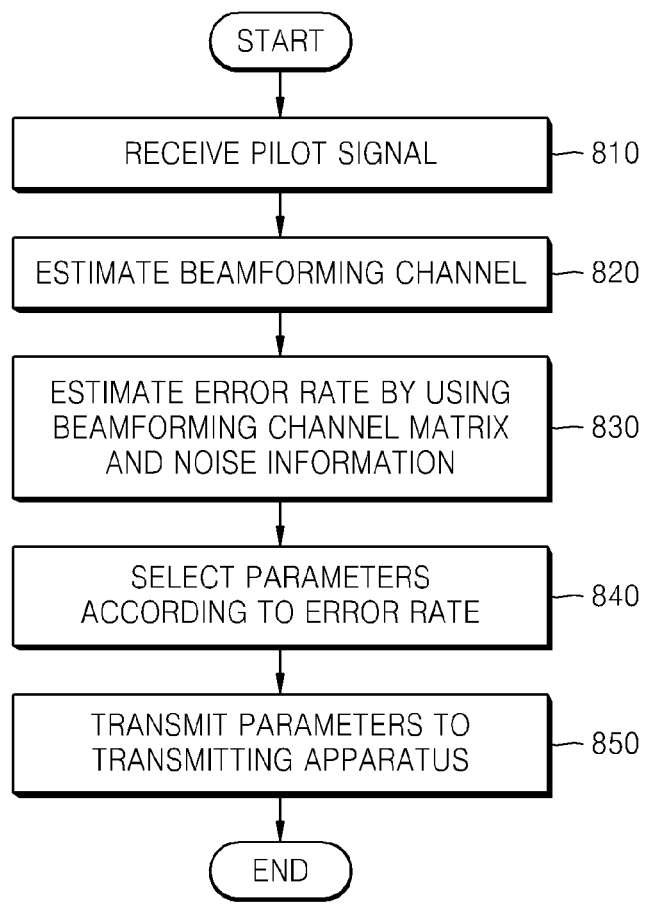
FIG. 8 illustrates a receiving method using beamforming according to an embodiment of the present invention.

FIG. 8 illustrates a receiving method using beamforming according to an embodiment of the present invention. Referring to FIG. 8, the receiving method includes operations that are sequentially performed in the receiving apparatus of FIG. 7. Accordingly, even if the receiving method is not described in complete detail, the description about the receiving apparatus of FIG. 7 can be applied to the receiving method of FIG. 8.

In operation 810, the receiving apparatus 701 using beamforming receives a pilot signal from a transmitting apparatus 301 (FIG. 3). The pilot signal is a signal that is added to a transmission signal to be transmitted by the transmitting apparatus 301 after beamforming.

In operation 820, the receiving apparatus 701 estimates a beamforming channel matrix based on the received pilot signal. It is understood, however, that the receiving apparatus 701 is not limited to estimating a beamforming channel matrix based on a received pilot signal in all aspects of the present invention, and may use other types of information instead of or in addition to the received pilot signal.

In operation 830, the receiving apparatus 701 estimates an error rate while the receiving apparatus 701 receives the pilot signal by using the beamforming channel matrix estimated in operation 820 and noise information included in the received pilot signal.

In operation 840, the receiving apparatus 701 selects parameters used while transmitting a data signal, according to the error rate estimated in operation 830.

In operation 850, the receiving apparatus 701 transmits the parameters selected in operation 840 to the transmitting apparatus 301.

Figure 9:
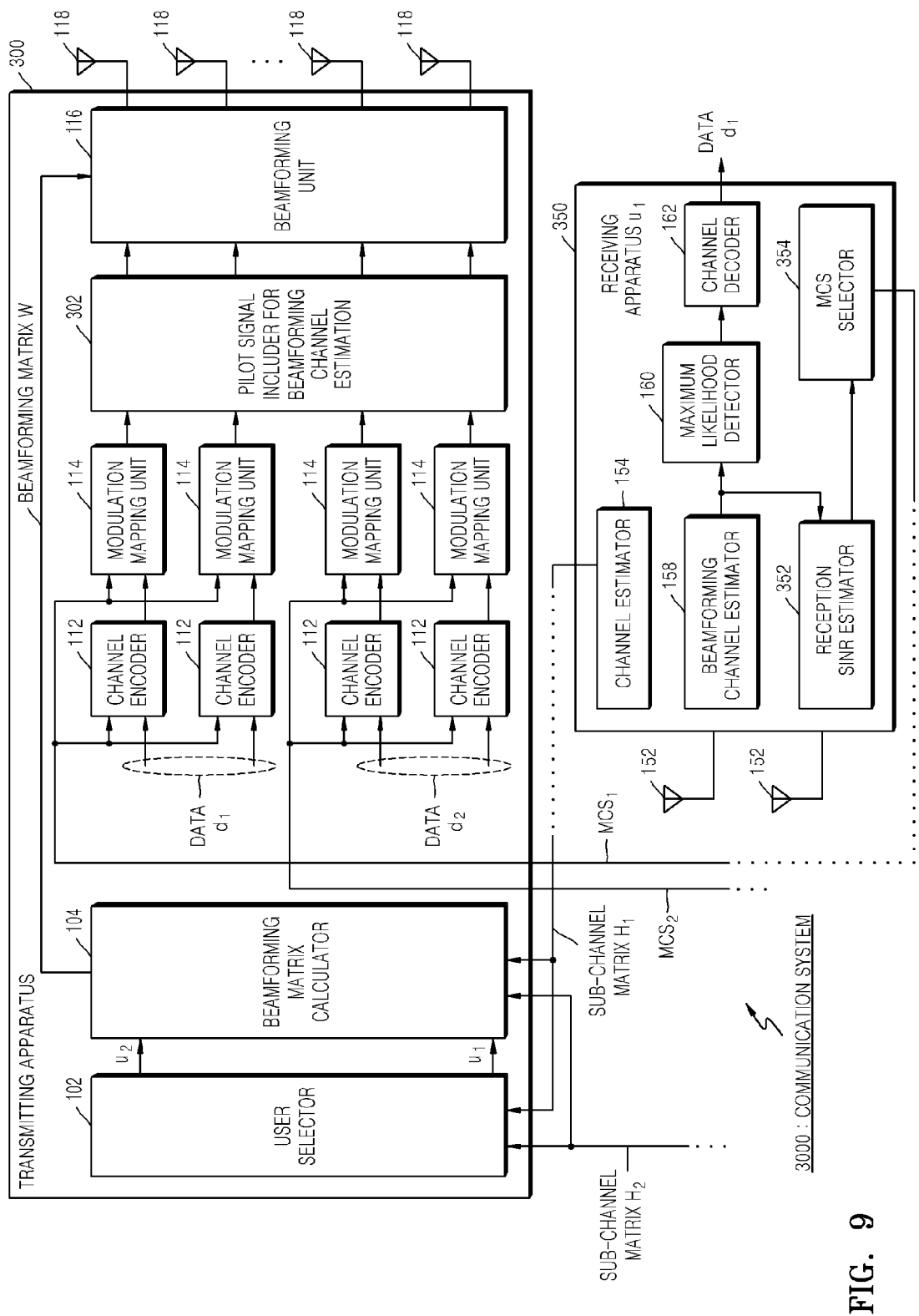
FIG. 9 illustrates a communication system according to another embodiment of the present invention.

FIG. 9 illustrates a communication system 3000 according to another embodiment of the present invention. In the communication system 3000, a receiving apparatus 350 estimates a sub-channel matrix and a noise variance value, and selects a modulation order and a channel encoding rate based on a reception SINR estimated from the sub-channel matrix and the noise variance value. Like reference numerals denote like elements in the communication systems 1000 and 3000, and thus descriptions of the same elements will not be repeated herein.

The communication system 3000 will now be described in detail with reference to FIG. 9. As illustrated in FIG. 9, the communication system 3000 includes a transmitting apparatus 300 and the receiving apparatus 350. Although only one receiving apparatus $u_1$ 350 is illustrated in FIG. 9, it is assumed that the communication system 3000 includes a plurality of receiving apparatuses 350, as indicated by the separate sub-channel matrix $H_2$ being transmitted from a receiving apparatus $u_2$ to the transmitting apparatus 300 in the lower-left corner of FIG. 9. For convenience of description, the receiving apparatus 350 of the user $u_1$ is described, but it is understood that one or more other receiving apparatuses 350 of different users besides the user $u_1$ may instead be used with the transmitting apparatus 300.

The transmitting apparatus 300 includes a user selector 102, a beamforming matrix calculator 104, a plurality of channel encoders 112, a plurality of modulation mapping units 114, a pilot signal includer for beamforming channel estimation 302, a beamforming unit 116, and a plurality of antennas 118.

The pilot signal includer for beamforming channel estimation 302 (hereinafter, referred to as the "pilot signal includer 302") adds a pilot signal to a transmission symbol vector inputted from the modulation mapping unit 114 to estimate a sub-channel matrix after beamforming. Also, the pilot signal includer 302 transmits the transmission symbol vector including the pilot signal to the beamforming unit 116.

The beamforming unit 116 performs the beamforming on the transmission symbol vector including the pilot signal based on the calculated beamforming matrix W and then transmits the transmission symbol vector.

The channel encoders 112 and the modulation mapping units 114 respectively perform channel encoding and modulation mapping based on information about the encoding rate and the modulation order fed back from the receiving apparatus 350.

As illustrated in FIG. 9, the receiving apparatus 350 includes a plurality of antennas 152, a channel estimator 154, a beamforming channel estimator 158, a maximum likelihood detector 160, a channel decoder 162, a reception SINR estimator 352, and an MCS selector 354.

The reception SINR estimator 352 calculates a reception power by using a sub-channel matrix $G_1$ after the beamforming estimated by the beamforming channel estimator 158. The reception SINR estimator 352 estimates a reception SINR after the beamforming by using the estimated noise variance value and the calculated reception power. Then, the reception SINR estimator 352 transmits information about the estimated reception SINR to the MCS selector 354.

The MCS selector 354 determines a transmission control parameter $MCS_1$ based on an estimated value of the reception SINR. For example, the MCS selector 354 selects a channel encoding rate and a modulation order of an error correction code so that the error rate is below a predetermined value while the transmission speed is maximized. The MCS selector 354 transmits information about the selected channel encoding rate to the channel encoders 112 and simultaneously transmits information about the selected modulation order to the modulation mapping units 114. The channel encoding rate and the modulation order are used in the maximum likelihood detector 160 or the channel decoder 162.

The communication system 3000 has been described above. In the communication system 3000, the transmitting apparatus 350 estimates a sub-channel matrix by transmitting the pilot signal after the beamforming. Also, the error correction encoding rate and the modulation order suitable for the receiving apparatus 350 are selected based on the reception SINR estimated from the sub-channel matrix. Also, since the parameters are set up based on the signal obtained through a channel which is actually used, the transmission control parameters are selected with a higher precision than by the communication system 1000.

Figure 10:
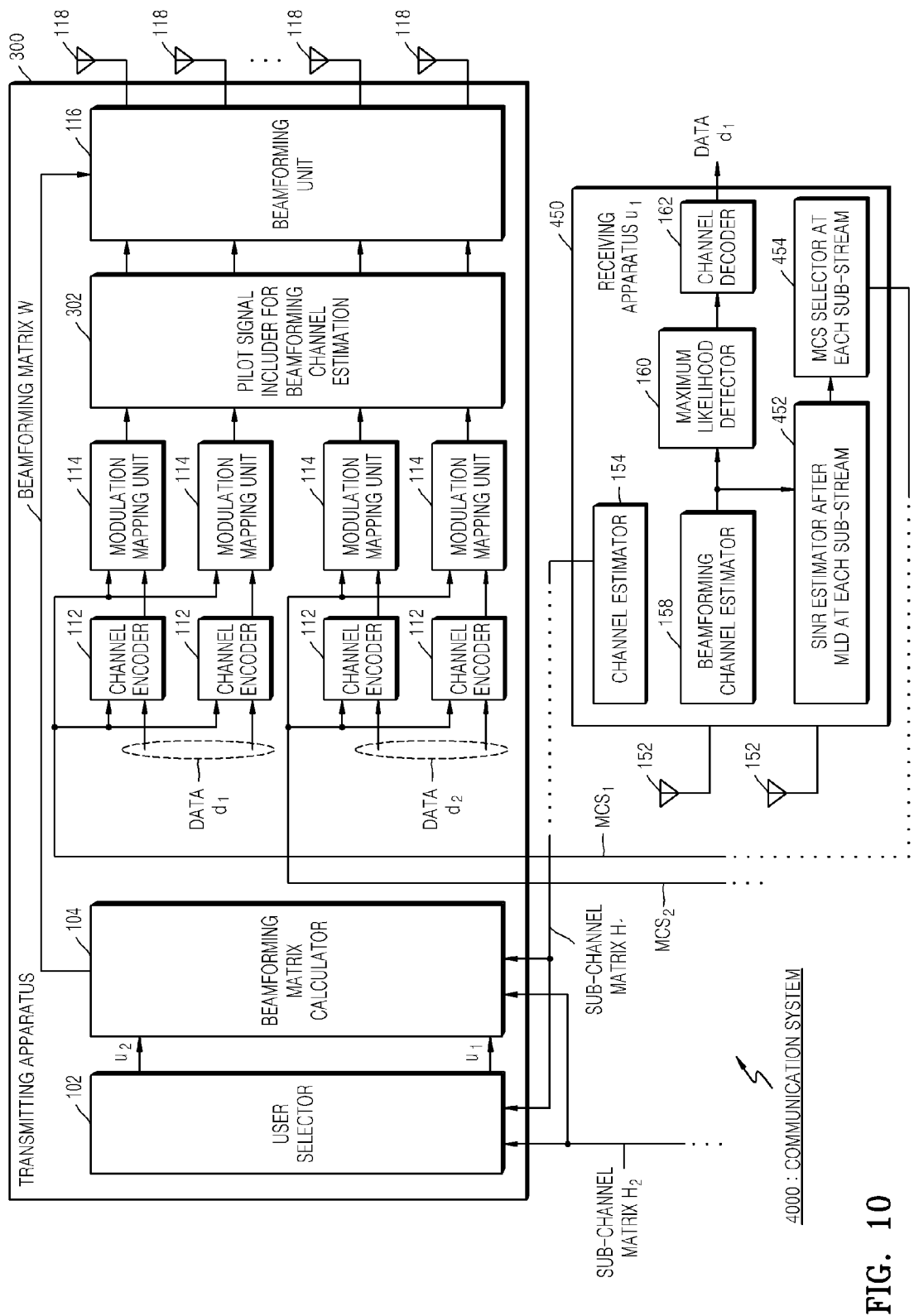
FIG. 10 illustrates a communication system according to another embodiment of the present invention.

FIG. 10 illustrates a communication system 4000 according to another embodiment of the present invention. In the communication system 4000, a receiving apparatus 450 estimates a sub-channel matrix and a noise variance value, and selects a modulation order and a channel encoding rate based on an SINR of each sub-stream estimated from the sub-channel matrix and the noise variance value. Like reference numerals in the communication system 4000 denote like elements in the communication system 1000 or 3000, and thus descriptions of the same elements will not be repeated herein.

The communication system 4000 will now be described in detail with reference to FIG. 10. As illustrated in FIG. 10, the communication system 4000 includes a transmitting apparatus 300 and the receiving apparatus 450. Although only one receiving apparatus $u_1$ 450 is illustrated in FIG. 10, it is assumed that the communication system 4000 includes a plurality of receiving apparatuses 450, as indicated by the separate sub-channel matrix $H_2$ being transmitted from a receiving apparatus $u_2$ to the transmitting apparatus 300 in the lower-left corner of FIG. 10. For convenience of description, the receiving apparatus 450 of the user $u_1$ is described, but the receiving apparatus 450 is not limited thereto.

As illustrated in FIG. 10, the receiving apparatus $u_1$ 450 includes a plurality of antennas 152, a channel estimator 154, a beamforming channel estimator 158, a maximum likelihood detector 160, a channel decoder 162, an SINR detector after MLD at each sub-stream 452, and an MCS selector at each sub-stream 454.

The SINR estimator after MLD at each sub-stream 452 (hereinafter, referred to as the "SINR estimator 452") first obtains a sub-channel matrix $G_1$ after the beamforming estimated by the beamforming channel estimator 158, and then calculates the minimum Euclid distance according to a predetermined modulation method in regards to the sub-channel matrix $G_1$. As described above, it is difficult to estimate the minimum Euclid distance for each sub-stream. Thus, the SINR estimator 452 uses the same Trellis search algorithm as the SINR estimator 208 of the communication system 2000 (FIG. 6) in order to calculate the minimum Euclid distance for each sub-stream.

The SINR estimator 452 calculates the SINR of each sub-stream after the MLD operation in regard to a candidate of the predetermined modulation method by using the calculated minimum Euclid distance and the estimated noise variance value. Then, the SINR estimator 452 transmits the calculated SINR of each sub-stream to the MCS selector in each sub-stream 454.

The MCS selector at each sub-stream 454 (hereinafter, referred to as the "MCS selector 452") predicts a bit error rate or packet error rate after performing an MLD operation and error correction decoding based on the SINR of each sub-stream after the MLD calculated by the SINR estimator 452, and selects an encoding rate and modulation order that decreases the predicted bit error rate or packet error rate below a predetermined value while increasing the transmission speed. Also, the MCS selector 454 transmits the selected encoding rate to the channel encoders 112 and simultaneously transmits the selected modulation order to the modulation mapping units 114.

The communication system 4000 has been described above. According to the communication system 4000, the receiving apparatus 450 estimates the sub-channel matrix by transmitting the pilot signal after performing the beamforming. Also, the error correction encoding rate and modulation order suitable for the receiving apparatus 450 are selected based on the reception SINR estimated from the sub-channel matrix. Also, since a transmission rate is set up based on the signal obtained through a channel which is actually used, the transmission control parameter is selected with a higher precision than by the communication system 1000. Moreover, it is possible to select the transmission control parameter for each sub-stream based on the SINR of each sub-stream after the MLD, to thereby control the transmission rate in a more suitable fashion for the MLD operation than by the communication system 3000.

As described above, in a multi-user MIMO system using zero-forcing beamforming according to aspects of the present invention, it is possible to set up a suitable transmission rate even when a receiving apparatus uses MLD. As a result, communication quality becomes stable and throughput increases.

In the embodiments of the present invention described above, a transmitting method and a receiving method for transmitting and receiving apparatuses of a certain user, such as the user $u_1$, has been described for convenience of description. However, the transmitting or receiving method can be applied to a transmitting or receiving apparatus of two or more other users in addition to the user $u_1$. The characteristics of each embodiment of the present invention can be combined. Also, the transmitting apparatus may include a receiving function, and the receiving apparatus may include a transmitting function. Alternatively, structures of the transmitting apparatus and the receiving apparatus may be included in one communication apparatus. In addition, the transmitting apparatus may further include a notification means to notify the receiving apparatus about information, and the receiving apparatus may further include a feedback means to feed back information to the transmitting apparatus. Also, the receiving and/or transmitting apparatuses can be employed in various computer networks, such as local area networks (LANs), the Internet, etc.

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), for example. The media may also be a distributed network, so that the computer readable code is stored/transferred and executed in a distributed fashion. Still further, as only an example, the processing element could include a processor or a computer processor, and processing elements may be distributed and/or included in a single device.

While aspects of the present invention has been particularly shown and described with reference to differing embodiments thereof, it should be understood that these exemplary embodiments should be considered in a descriptive sense only and not for purposes of limitation. Any narrowing or broadening of functionality or capability of an aspect in one embodiment should not considered as a respective broadening or narrowing of similar features in a different embodiment, i.e., descriptions of features or aspects within each embodiment should typically be considered as available for other similar features or aspects in the remaining embodiments.

Thus, although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A transmitting apparatus comprising:
a beamforming channel matrix calculator, which calculates a beamforming channel matrix, which is a channel matrix generated at a time when the transmitting apparatus applies a beamforming matrix to a data signal, and then transmits the data signal to receiving apparatuses;
a transmission parameter selector, which selects a parameter that is used while the data signal is transmitted by the transmitting apparatus, based on an error rate estimated by using the beamforming channel matrix and noise information fed back from the receiving apparatuses; and
a transmitter, which transmits the data signal by using the selected parameter.

2. The transmitting apparatus of claim 1, wherein the beamforming channel matrix calculator calculates the beamforming channel matrix based on a channel matrix between the receiving apparatuses and the transmitting apparatus, and the beamforming matrix.

3. The transmitting apparatus of claim 1, further comprising a beamforming matrix calculator, which calculates the beamforming matrix by using channel matrices between the respective receiving apparatuses and the transmitting apparatus fed back from the receiving apparatuses.

4. The transmitting apparatus of claim 1, further comprising a receiving apparatus selector, which selects receiving apparatuses corresponding to the maximum channel capacity from among the receiving apparatuses, wherein the transmission parameter selector is fed back noise information related to the receiving apparatuses selected by using the selected parameter.

5. The transmitting apparatus of claim 1, further comprising an error rate estimator, which estimates an error rate corresponding to each receiving apparatus by using the beamforming channel matrix and the noise information fed back from the receiving apparatuses, wherein the transmission parameter selector selects the parameter corresponding to each receiving apparatus based on the error rate.

6. The transmitting apparatus of claim 5, wherein the error rate estimator estimates an error rate corresponding to substreams forming the data signal by using the beamforming channel matrix and the noise information fed back from the receiving apparatuses, and the transmission parameter selector selects a parameter, which is used while transmitting each of the sub-streams, for each sub-stream based on the error rate.

7. The transmitting apparatus of claim 6, wherein the error rate estimator estimates an error rate corresponding to each sub-stream by using the noise information and a minimum Euclidean distance that is calculated at each possible modulation order in regard to component blocks formed of components corresponding to the sub-streams from among components of the beamforming channel matrix.

8. A receiving apparatus, comprising:
a beamforming channel estimator, which receives a pilot signal to which a beamforming matrix has been applied, from a transmitting apparatus, and estimates a beamforming channel matrix, which is a channel matrix generated at a time when the transmitting apparatus applies the beamforming matrix to the pilot signal and transmits the pilot signal to the receiving apparatus, from the pilot signal;
a transmission parameter selector, which selects a parameter to be used while transmitting a data signal based on an error rate estimated by using the beamforming channel matrix and noise information included in the pilot signal; and
a transmitter, which transmits the selected parameter to the transmitting apparatus.

9. The receiving apparatus of claim 8, further comprising an error rate estimator, which estimates an error rate by using the beamforming channel matrix and the noise information, wherein the transmission parameter selector selects the parameter based on the error rate.

10. The receiving apparatus of claim 9, wherein the error rate estimator estimates a plurality of the error rates respectively corresponding to sub-streams forming the data signal by using the beamforming channel matrix and the noise information, and the transmission parameter selector selects a parameter, which is used while transmitting each sub-stream, for each sub-stream based on the respective error rates.

11. The receiving apparatus of claim 10, wherein the error rate estimator estimates an error rate corresponding to each sub-stream by using the noise information and a minimum Euclidean distance that is calculated at each possible modulation order in regard to component blocks formed of components corresponding to the sub-streams from among components of the beamforming channel matrix.

12. A transmitting method comprising:
calculating a beamforming channel matrix, which is a channel matrix generated at a time when a transmitting apparatus applies a beamforming matrix to a data signal and transmits the data signal to receiving apparatuses;
selecting a parameter that is used while transmitting the data signal based on an error rate estimated by using the beamforming channel matrix and noise information fed back from the receiving apparatuses; and
transmitting the data signal by using the selected parameter.

13. The transmitting method of claim 12, further comprising estimating an error rate corresponding to each receiving apparatus by using the beamforming channel matrix and the noise information fed back from the receiving apparatuses, wherein the selecting of a parameter comprises selecting the parameter corresponding to each receiving apparatus based on the error rate.

14. The transmitting method of claim 12, further comprising estimating an error rate corresponding to sub-streams forming the data signal by using the beamforming channel matrix and the noise information fed back from the receiving apparatuses, wherein the selecting of a parameter comprises selecting a parameter, which is used while transmitting each sub-stream, for each sub-stream based on the error rate.

15. The transmitting method of claim 14, wherein the estimating of an error rate comprises estimating an error rate corresponding to each sub-stream by using the noise information and a minimum Euclidean distance that is calculated at each possible modulation order in regard to each component block formed of components corresponding to the sub-streams from among components of the beamforming channel matrix.

16. A receiving method comprising:
receiving a pilot signal to which a beamforming matrix is applied from a transmitting apparatus;
estimating a beamforming channel matrix which is a channel matrix generated at a time when the transmitting apparatus applies the beamforming matrix to the pilot signal and then transmits the pilot signal to a receiving apparatus;
selecting a parameter to be used while transmitting a data signal based on an error rate estimated by using the beamforming channel matrix and noise information included in the pilot signal; and
transmitting the selected parameter to the transmitting apparatus.

17. The receiving method of claim 16, further comprising estimating an error rate by using the beamforming channel matrix and the noise information, wherein the selecting of a parameter comprises selecting the parameter based on the error rate.

18. The receiving method of claim 16, further comprising estimating error rates respectively corresponding to sub-streams forming the data signal by using the beamforming channel matrix and the noise information, wherein the selecting of a parameter comprises selecting the parameter, which is used while transmitting each sub-stream, for each sub-stream based on the error rate.

19. The receiving method of claim 18, wherein the estimating of an error rate comprises estimating a plurality of the error rates respectively corresponding to each sub-stream by using the noise information and a minimum Euclidean distance calculated at each possible modulation order in regard to each component block formed of components corresponding to the sub-streams from among components of the beamforming channel matrix.

20. A non-transitory computer readable medium having computer readable code to implement a method of receiving, the method comprising:

receiving a pilot signal to which a beamforming matrix is applied from a transmitting apparatus;

estimating a beamforming channel matrix which is a channel matrix generated at a time when the transmitting apparatus applies the beamforming matrix to the pilot signal and then transmits the pilot signal to a receiving apparatus;

selecting a parameter to be used while transmitting a data signal based on an error rate estimated by using the beamforming channel matrix and noise information included in the pilot signal; and transmitting the selected parameter to the transmitting apparatus.

* * * * *